(12) United States Patent
Kawamura et al.

(10) Patent No.: US 8,936,227 B2
(45) Date of Patent: Jan. 20, 2015

(54) SEAT SLIDE APPARATUS FOR VEHICLE

(71) Applicant: Aisin Seiki Kabushiki Kaisha, Kariya (JP)

(72) Inventors: Tateki Kawamura, Inazawa (JP); Wataru Sakaguchi, Kariya (JP); Yukifumi Yamada, Toyota (JP); Naoki Goto, Tokai (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 76 days.

(21) Appl. No.: 13/764,081

(22) Filed: Feb. 11, 2013

(65) Prior Publication Data

US 2013/0214112 A1 Aug. 22, 2013

(30) Foreign Application Priority Data

Feb. 21, 2012 (JP) ................................. 2012-035242

(51) Int. Cl.
*F16M 13/00* (2006.01)
*B60N 2/08* (2006.01)
(Continued)

(52) U.S. Cl.
CPC ................ *B60N 2/08* (2013.01); *B60N 2/0715* (2013.01); *B60N 2/0818* (2013.01); *B60N 2/0705* (2013.01); *B60N 2/085* (2013.01); *B60N 2/42709* (2013.01)
USPC .......................... 248/548; 248/429; 297/216.1

(58) Field of Classification Search
CPC ............. B60N 2/42709; B60N 2/0818; B60N 2/4214; B60N 2/085; B60N 2/4228; B60N 2/42736; B60N 2/43; B64D 2011/0627

USPC .................. 248/548, 550, 424, 429; 297/341, 297/344.1, 216.1
See application file for complete search history.

(56) References Cited

U.S. PATENT DOCUMENTS 3,631,740 A * 1/1972 Gavagan ........................ 74/527
7,070,236 B2 * 7/2006 Kawashima ............. 297/216.14
(Continued)

FOREIGN PATENT DOCUMENTS

DE 20 2007 004 524 U1 9/2008
FR 2 767 096 A1 2/1999
(Continued)

OTHER PUBLICATIONS

Extended European Search Report issued Jun. 12, 2013, in Patent Application No. 13156057.5.

*Primary Examiner* — Bradley Duckworth
(74) *Attorney, Agent, or Firm* — Oblon, Spivak, McClelland, Maier & Neustadt, L.L.P.

(57) ABSTRACT

A seat slide apparatus for a vehicle includes a first rail including a locked portion, a second rail movably connected relative to the first rail and including bearing holes, a lock member including a lock portion and rotating around the bearing holes to engage the lock portion with the locked portion and disengage the lock portion from the locked portion to selectively bring a relative movement between the first and second rail into a locked state, and wherein the second rail includes a fracture opening allowing the shaft portion to shift from the bearing hole in a case where a load is inputted in the direction of the relative movement, and a restriction portion configured to restrict the lock member from rotating in a direction in which the locked state is released in a case where the shaft portion shifts from the bearing hole.

9 Claims, 9 Drawing Sheets

(51) Int. Cl.
  *B60N 2/07* (2006.01)
  *B60N 2/427* (2006.01)

(56) References Cited

U.S. PATENT DOCUMENTS 7,992,934 B2 * 8/2011 Cailleteau ............... 297/216.14
8,052,195 B2 * 11/2011 Aufrere et al. ............ 296/68.1
8,469,328 B2 * 6/2013 Nakamura et al. ............ 248/430
8,708,300 B2 * 4/2014 Fujishiro et al. ............ 248/429
2005/0140190 A1 * 6/2005 Kawashima ............ 297/216.14
2012/0205512 A1 * 8/2012 Fujishiro et al. ............ 248/429

FOREIGN PATENT DOCUMENTS

JP        2011-98610       5/2011
WO    WO 2009/145045 A1   12/2009

* cited by examiner

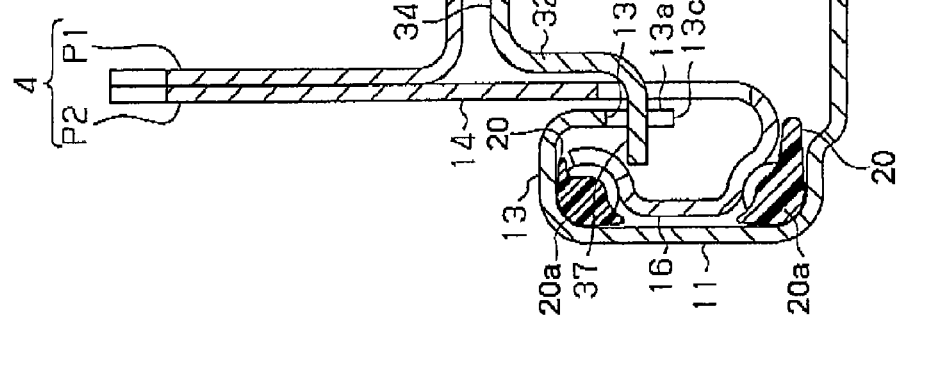
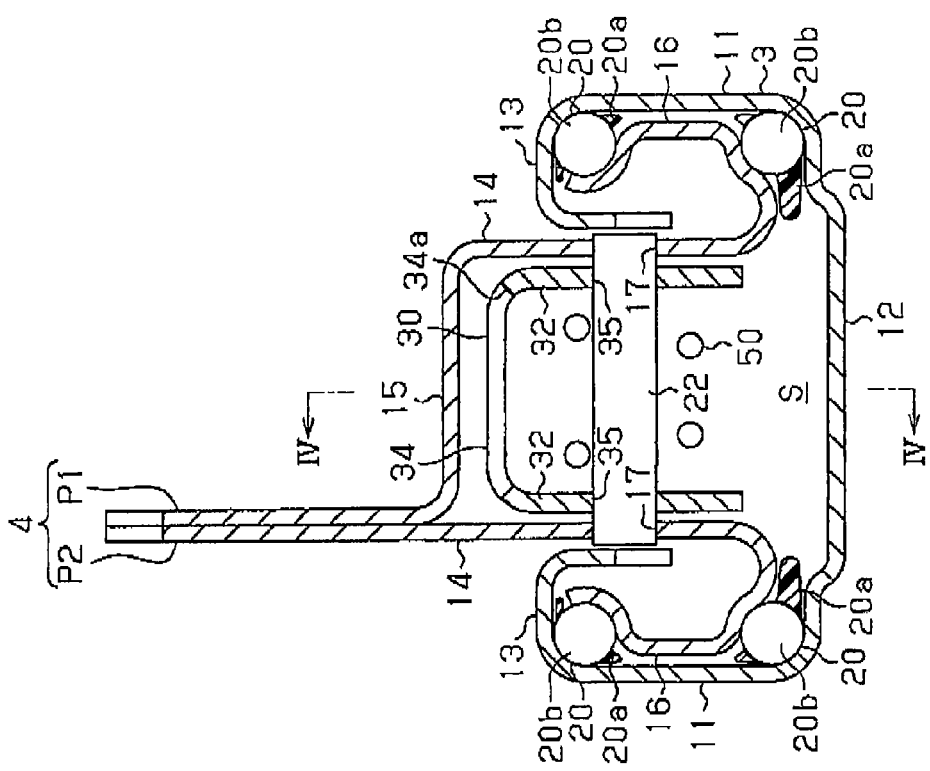

Front side ⟵⟶ Rear side

Front side ←⎯⎯⎯→ Rear side

SEAT SLIDE APPARATUS FOR VEHICLE

CROSS REFERENCE TO RELATED APPLICATIONS

This application is based on and claims priority under 35 U.S.C. §119 to Japanese Patent Application 2012-035242, filed on Feb. 21, 2012, the entire content of which is incorporated herein by reference.

TECHNICAL FIELD

This disclosure generally relates to a seat slide apparatus for a vehicle.

BACKGROUND DISCUSSION

A known seat slide apparatus for a vehicle is disclosed, for example, in JP2011-98610A (which will be hereinafter referred to as Reference 1). As illustrated in FIG. 8, the known seat slide apparatus disclosed in Reference 1 includes a lower rail 110, an upper rail 120 slidably connected relative to the lower rail 110, and a lock member 130 arranged in a space formed between the lower rail 110 and the upper rail 120 and including elasticity (an elastic force). The lower rail 110 includes flanges 111 in a width direction thereof. Locked portions 112 formed substantially in pawls are formed at ends of the flanges 111.

The lock member 130 extends in a longitudinal direction of the lower rail 110 and the upper rail 120 and includes a fixed portion 131 and a lock portion 132. The fixed portion 131 is formed at a first end portion at one side of the lock member 130 in the longitudinal direction while the lock portion 132 is formed at a second end portion at the other side of the lock member 130 in the longitudinal direction. The fixed portion 131 is fixedly attached to a covering wall portion 121 of the upper rail 120. The lock portion 132 is engageable with and disengageable from the locked portions 112 of the lower rail 110. The lock portion 132 is inserted in lock-portion insertion openings 124 formed in side wall portions 122 and side flanges 123 of the upper rail 120 in a width direction thereof. The lock member 130 includes an attachment portion 133 which is arranged at an end of the lock portion 132 so as to extend substantially upward therefrom. An operation member 140 is attached to the attachment portion 133 of the lock member 130. The fixed portion 131 is provided at the first end portion located close to the operation member 140 and the attachment portion 133 is provided at the second end portion located away from the operation member 140.

In a normal state, the lock member 130 is configured so that the lock portion 132 is engaged with the locked portions 112 of the lower rail 110 by the elastic force. In addition, the attachment portion 133 is pressed downward by an operation of the operation member 140; thereby, the lock portion 132 is elastically deformed so as to disengage from the locked portions 112 of the lower rail 110. Thus, a relative movement of the upper rail 120 to the lower rail 110 may be selectively locked or unlocked.

In particular, according to the known seat slide apparatus, as illustrated in FIG. 9A, a fixing hole 125 which includes a substantially annular shape and through which a fixing pin 135 penetrates is formed in the covering wall portion 121 of the upper rail 120. In addition, a movement allowing portion 126 including an elongated shape is continuously formed with the fixing hole 125 so as to connect thereto. The fixed portion 131 of the lock member 130 is connected and fixed to the covering wall portion 121 of the upper rail 120 by the fixing pin 135. In a case where a large load is inputted in the longitudinal direction (in a direction of the relative movement of the upper rail 120 to the lower rail 110), the movement allowing portion 126 is elastically deformed while being pressed by the fixing pin 135, therefore allowing the fixing pin 135 (i.e., the lock member 130) to move relative to the upper rail 120.

In addition, according to the seat slide apparatus, as illustrated in FIG. 9B, a movement restriction portion 124a is continuously formed with each of the lock-portion insertion openings 124 of the upper rail 120 so as to connect to the lock-portion insertion opening 124. The movement restriction portion 124a restricts the lock member 130 from moving in a disengaging direction thereof (i.e., in a direction in which the lock member 130 is disengaged from a locked state with the locked portions 112 of the lower rail 110) when the fixing pin 135 (the lock member 130) in the movement allowing portion 126 moves in the longitudinal direction.

For example, a large load is inputted in the longitudinal direction because of a front collision of the vehicle in a state where the relative movement of the upper rail 120 to the lower rail 110 is locked by the lock member 130. In such case, according to the known seat slide apparatus of Reference 1, the lock member 130 slides rearward relative to the upper rail 120 along with the lower rail 110 in the longitudinal direction while the movement allowing portion 126 of the upper rail 120 is elastically deformed by the fixing pin 135. At this time, the lock member 130 is restricted by the movement restriction portion 124a from moving in the disengaging direction. As a result, the lock member 130 may stably maintain the locked state of the relative movement between the lower rail 110 and the upper rail 120.

According to Reference 1, in order to effectively elastically deform the lock member 130 supported via the first end portion thereof by the covering wall portion 121 of the upper rail 120 and including the elasticity, the lock member 130 is configured so that the attachment portion 133 is provided at the second end portion located away from the operation member 140. In such case, the operation member 140 is elongated to the attachment portion 133; therefore, the length and mass of the operation member 140 may increase.

For example, a known seat slide apparatus to which a lock member made of a material including high rigidity is applied instead of the lock member 130 including the elasticity, is disclosed. In the known seat slide apparatus, an intermediate portion of the lock member in a longitudinal direction thereof is rotatably connected to an upper rail. In the known seat slide apparatus, the lock member including a lock portion and an extending portion is rotatably biased by a biasing member serving as a separate component from the lock member, in a direction in which the lock portion engages with locked portions of a lower rail. Therefore, the lock member may be connected to an operation member by the extending portion extending toward the operation member. In particular, the extending portion is moved upward by an operation of the operation member; thereby, the lock member rotates against a biasing force of the biasing member so as to disengage the lock portion from the locked portions of the lower rail. Thus, according to the aforementioned known seat slide apparatus, a relative movement of the upper rail to the lower rail may be selectively locked and unlocked while increases of the length and mass of the operation member are restricted.

However, for example, in a case where a movement allowing portion similar to the movement allowing portion 126 of Reference 1 is applied to the known seat slide apparatus including the above-mentioned configuration, the movement allowing portion including an elongated hole is continuously formed with a bearing hole of the upper rail so as to connect to the bearing hole by which a shaft portion of the lock member is supported. As a result, a clearance allowance between the bearing hole and the shaft portion of the lock member may increase; therefore, a rotation of the lock member may be unstable.

A need thus exists for a seat slide apparatus for a vehicle, which is not susceptible to the drawbacks mentioned above.

SUMMARY

According to an aspect of this disclosure, a seat slide apparatus for a vehicle includes a first rail including a pair of flanges arranged next to each other in a width direction of the vehicle and including ends, at each of which a locked portion is formed, a second rail movably connected relative to the first rail and including a pair of side wall portions arranged next to each other between the flanges in the width direction, the second rail including bearing holes, each axis line of which extends in the width direction, a lock member including a pair of vertical wall portions which are arranged next to each other between the side wall portions in the width direction and at which a shaft portion supported in the bearing holes is arranged, and a lock portion engageable with and disengageable from the locked portion, the lock member rotating around the bearing holes to engage the lock portion with the locked portion and disengage the lock portion from the locked portion to selectively bring a relative movement between the first rail and the second rail into a locked state, a biasing member biasing the lock member to rotate in a direction in which the relative movement between the first rail and the second rail is brought in the locked state, and an operation member configured to transmit an operating force for releasing the locked state of the relative movement to the lock member, wherein a fracture opening is formed at each of the side wall portions and is positioned next to each of the bearing holes in a separating manner from the bearing hole in a direction of the relative movement between the first rail and the second rail, the fracture opening allowing the shaft portion to shift from the bearing hole in a case where a load is inputted in the direction of the relative movement, and wherein a restriction portion is formed at the second rail and is configured to restrict the lock member from rotating in a direction in which the locked state of the relative movement is released in a case where the shaft portion shifts from the bearing hole.

BRIEF DESCRIPTION OF THE DRAWINGS

The foregoing and additional features and characteristics of this disclosure will become more apparent from the following detailed description considered with the reference to the accompanying drawings, wherein:

FIG. 3A is a cross-sectional view of the seat slide apparatus according to the embodiment disclosed here;

FIG. 3B is a cross-sectional view of the seat slide apparatus according to the embodiment disclosed here;

DETAILED DESCRIPTION

Figure 1:
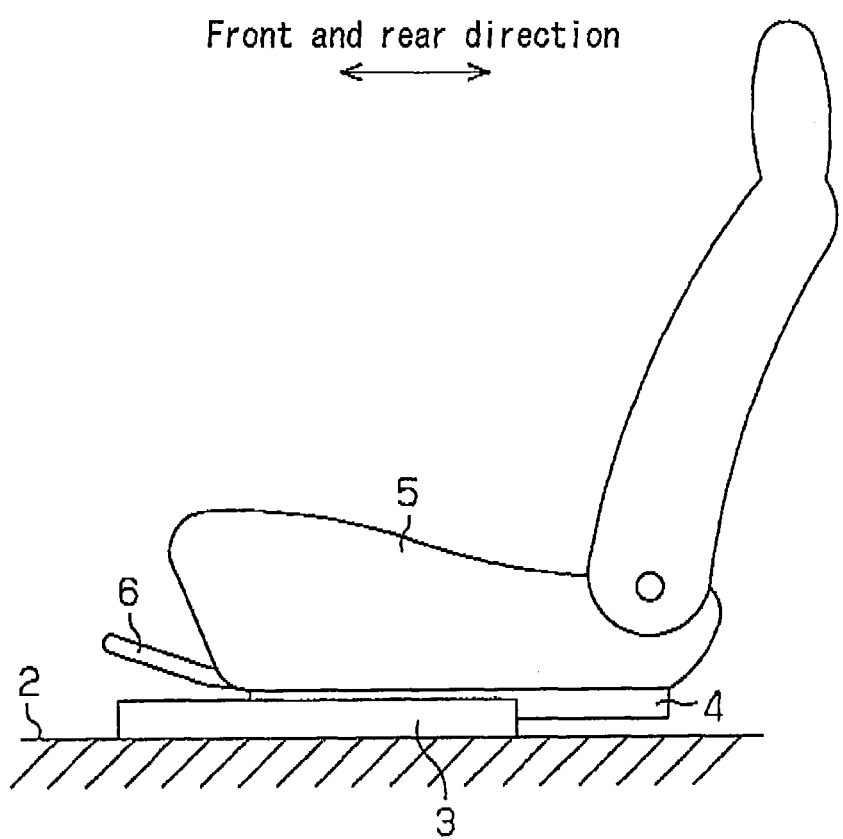
FIG. 1 is a side view of a vehicle seat to which a seat slide apparatus for a vehicle, according to an embodiment disclosed here is applied.

An embodiment of this disclosure will be described as follows with reference to FIGS. 1 to 6. As illustrated in FIG. 1, a seat slide apparatus for a vehicle, according to the embodiment includes a lower rail 3 serving as a first rail and an upper rail 4 serving as a second rail. The lower rail 3 is fixed to a vehicle floor 2 so as to extend in a front and rear direction of the vehicle. The upper rail 4 is attached to the lower rail 3 so as to slide relative the lower rail 3 in the front and rear direction.

A pair of lower rails 3 and a pair of upper rails 4 are arranged in a width direction of the vehicle (in a direction perpendicular to a horizontal direction in FIG. 1). FIG. 1 shows the lower rail 3 and the upper rail 4 that are arranged at a left side in the width direction as seen toward a front side of the vehicle from an occupant of the vehicle. A seat 5 configuring a seating portion for the occupant of the vehicle is supported by the pair of upper rails 4 and is fixed to the pair of upper rails 4. A relative movement of the upper rail 4 to the lower rail 3 is basically in a locked state. In addition, the seat slide apparatus of the embodiment includes a release handle 6 serving as an operation member for releasing the locked state of the relative movement.

Figure 2:
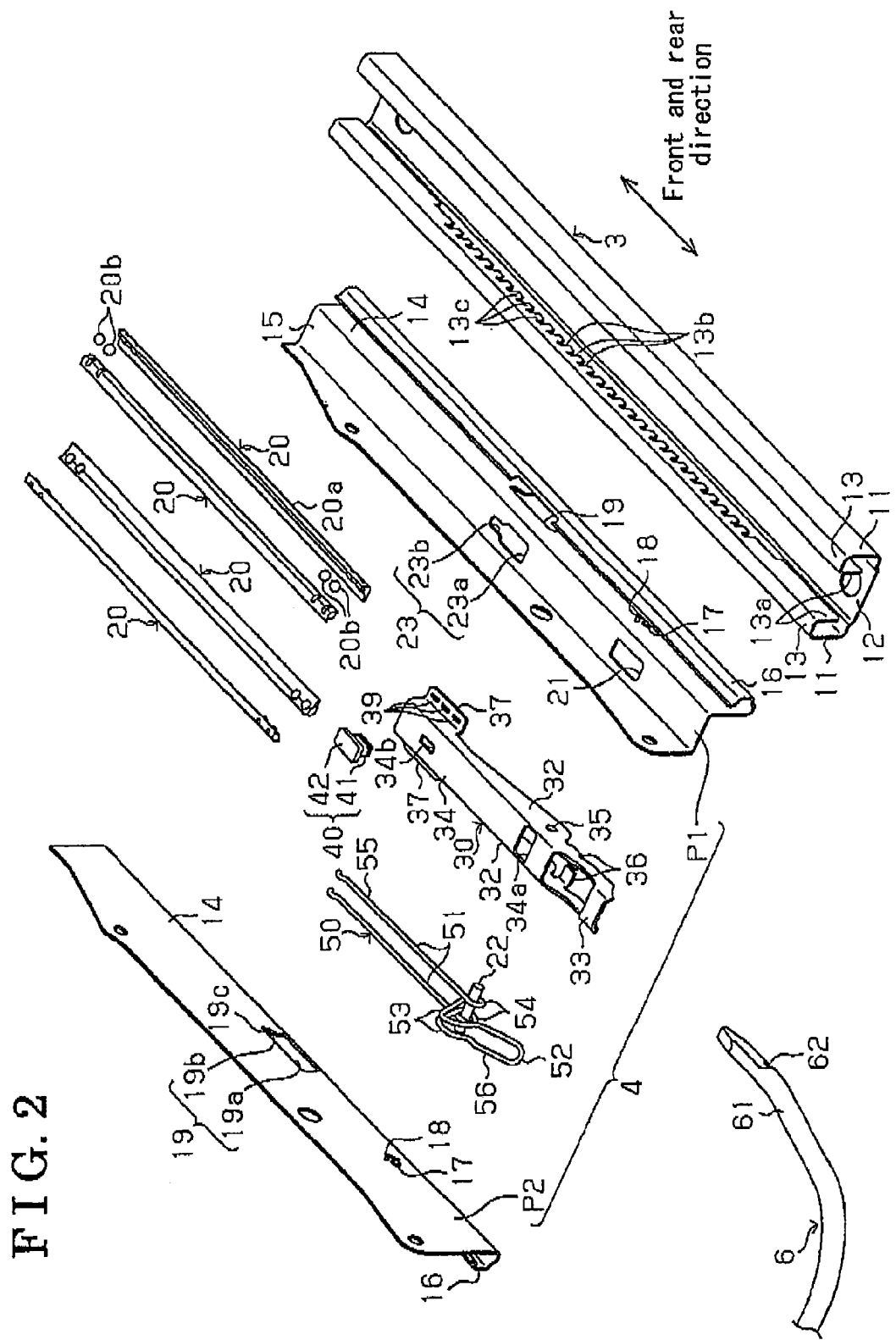
FIG. 2 is a perspective view of the seat slide apparatus according to the embodiment disclosed here.

As illustrated in FIG. 2, the lower rail 3 formed by a plate member includes a pair of first side wall portions 11 arranged in the width direction to extend in an upper and lower direction of the lower rail 3, and a first connecting wall portion 12 connecting second ends (lower ends) of the first side wall portions 11. First folded wall portions 13 are continuously formed with respective first ends (upper ends) of the first side wall portions 11. The first folded wall portions 13 are formed so as to extend inwardly from the upper ends of the first side wall portions 11 and are further folded toward the lower ends of the first side wall portions 11.

In addition, an end portion of each of the first folded wall portions 13 in the width direction extends downward to form a flange 13a. Multiple out portions 13b are formed at predetermined intervals at an intermediate portion of the flange 13a in a longitudinal direction thereof so as to be recessed upward from an end (a lower end). Multiple locked portions 13c arranged at an end of the flange 13a and including square toothed portions are formed between the cut portions 13b adjacent to one another in the longitudinal direction. Therefore, the locked portions 13c are provided adjacent to one another while being at predetermined intervals in a longitudinal direction of the lower rail 3.

Upper end portions of a substantially-stepped plate member P1 and a substantially-plate-shaped member P2 are connected to each other, thereby forming the upper rail 4. As illustrated in FIGS. 3A and 38, the upper rail 4 includes a pair of second side wall portions 14 serving as side wall portions and a second connecting wall portion 15 serving as a connecting wall portion. The pair of second side wall portions 14 is positioned between the first folded wall portions 13 (the flanges 13a) of the lower rail 3 so as to extend in the upper and lower direction. The second side wall portions 14 include respective first ends (upper ends, i.e., ends) located away from the lower rail 3 and the upper ends of the second side wall portions 14 are connected to each other by the second connecting wall portion 15. Second folded wall portions 16 are continuously formed with respective second ends (lower ends) of the second side wall portions 14. The second folded wall portions 16 are formed so as to extend outwardly from the lower ends of the second side wall portions 14 and are further folded so as to be surrounded by the first folded wall portions 13.

In other words, the lower rail 3 and the upper rail 4 include U-shaped cross sections facing each other. The upper rail 4 is restricted from loosening from the lower rail 3 mainly by engagement between the second folded wall portions 16 and the first folded wall portions 13. A rail cross-section formed by the lower rail 3 and the upper rail 4 is a box shape forming a substantially rectangular shape. A space S is formed by both the lower rail 3 and the upper rail 4.

Figure 5:
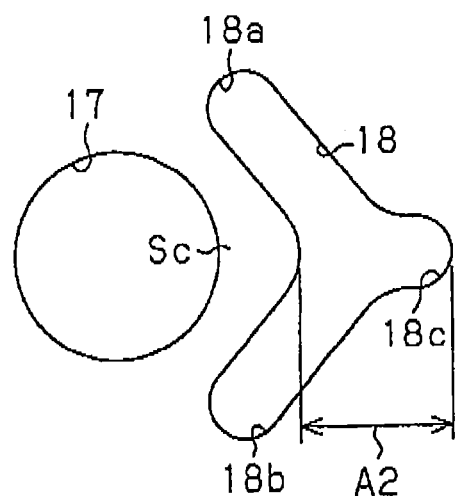
FIG. 5 is an enlarged side view of a bearing hole and a fracture opening according to the embodiment.

As illustrated in FIG. 2, a bearing hole 17 having an annular shape is formed at a front end portion of each of the second side wall portions 14 of the upper rail 4. In addition, a fracture opening 18 including a substantially Y-shape is formed at the second side wall portion 14 so as to be positioned adjacent to and at a rear side of the bearing hole 17. The bearing hole 17 and the fracture opening 18 are provided to separate from each other. In particular, as illustrated in FIG. 5, the fracture opening 18 includes a pair of inclined opening portions 18a and 18b symmetric in an upper and lower direction of the upper rail 4 relative to a line linearly passing through a center of the bearing hole 17 along a front and rear direction of the upper rail 4. The fracture opening 18 further includes an extending opening portion 18c extending rearward from a connected portion of the inclined opening portions 18a and 18b along the line. A boundary portion between the bearing hole 17 and the fracture opening 18 forms a stress concentration portion Sc including a substantially V-shape.

Further, as illustrated in FIG. 2, a through hole 19 is formed at each of the second side wall portions 14 of the upper rail 4 so as to be positioned at a rear side of the fracture opening 18. The through hole 19 includes a lock-portion insertion opening portion 19a forming a substantially rectangular shape, and a lock-portion restriction opening portion 19b (serving as a restriction portion) forming a substantially rectangular shape. The lock-portion restriction opening portion 19b is continuously formed with a rear end at an upper portion of the lock-portion insertion opening portion 19a so as to connect to the lock-portion insertion opening portion 19a. An inner wall surface at a lower side of the lock-portion restriction opening portion 19b forms an inclined portion 19c inclined gradually upward toward a rear side of the upper rail 4 (see FIG. 4).

Figure 4:
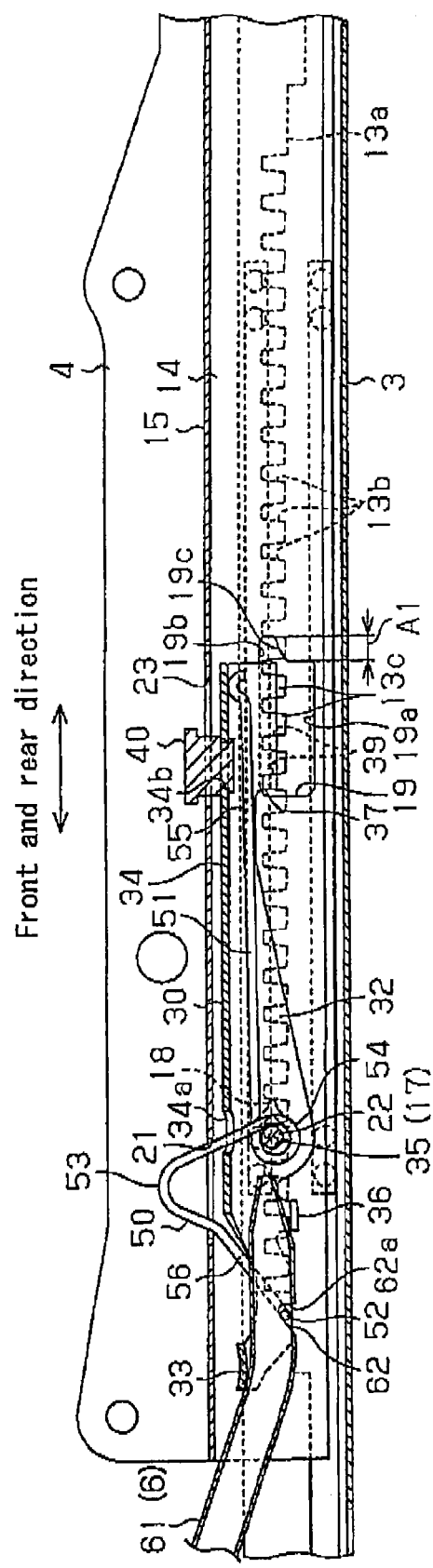
FIG. 4 is a cross-sectional view taken along the line IV-IV of FIG. 3A.

Here, as illustrated in FIG. 4, an opening width of the lock-portion restriction opening portion 19b in the front and rear direction is indicated by A1. As illustrated in FIG. 5, an opening width of the fracture opening 18 in the front and rear direction is indicated by A2. The opening width A2 of the fracture opening 18 is designed to be substantially equal to or greater than the opening width A1 of the lock-portion restriction opening portion 19b.

Figure 6A:
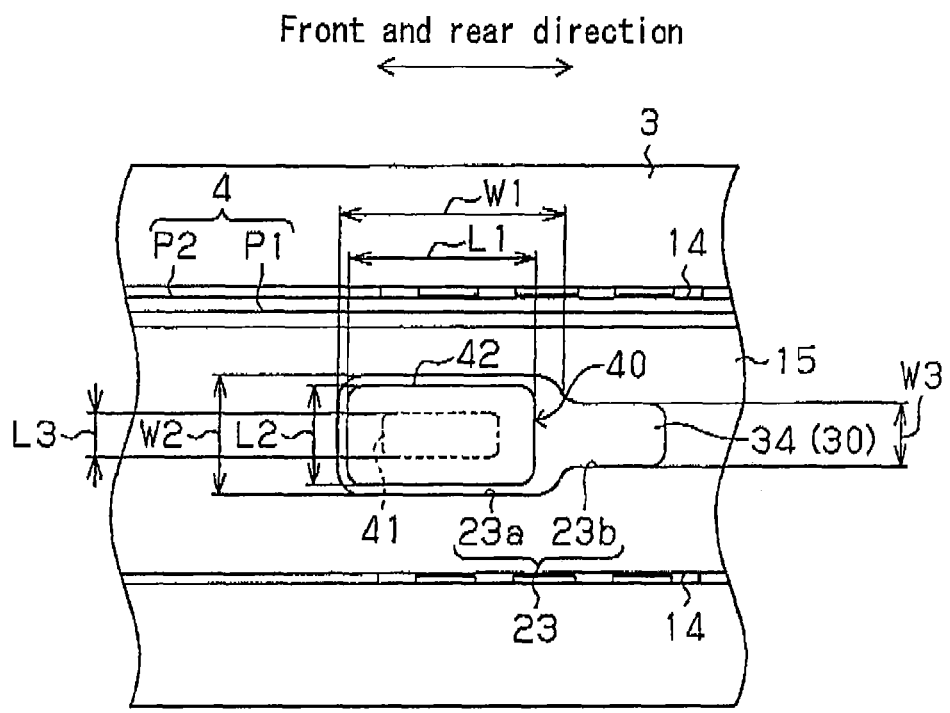
FIG. 6A is an enlarged plan view of a flange-portion movement restriction opening and a lock member according to the embodiment.

As illustrated in FIG. 2, a support hole 21 including a substantially rectangular shape is formed at the second connecting wall portion 15 of the upper rail 4 so as to be positioned adjacent to and at a front side of the bearing hole 17. In addition, a flange-portion movement restriction opening 23 is formed at the second connecting wall portion 15 so as to conform to a position of the through hole 19 in the front and rear direction. As illustrated in FIG. 6A, the flange-portion movement restriction opening 23 includes an insertion hole 23a and a restriction hole 23b that include substantially rectangular shapes. The restriction hole 23b is arranged at a rear end of the insertion hole 23a so as to connect to the rear end and is designed to have a width smaller than a width of the insertion hole 23a. Therefore, the flange-portion movement restriction opening 23 forms a substantially bottle shape.

As illustrated in FIGS. 3A and 3B, roller members 20 are arranged between a lower end of each of the second folded wall portions 16 and a lower end of each of the first side wall portions 11 facing the second folded wall portions 16, respectively, and between an upper end of each of the second folded wall portions 16 and an upper end of each of the first side wall portions 11 facing the second folded wall portions 16, respectively. As illustrated in FIG. 2, each of the roller members 20 includes a holder 20a made of resin and extending in the front and rear direction (the longitudinal direction of the lower rail 3 and the upper rail 4), and balls 20b attached to the holder 20a. A pair of balls 20b is arranged at a front end portion of the holder 20a and another pair of balls 20b is arranged at a rear end portion of the holder 20a, that is, the four balls 20b are arranged at the holder 20a. The upper rail 4 is slidably supported by the lower rail 3 in the longitudinal direction (in the front and rear direction) in a manner that the balls 20b of the roller members 20 roll between the lower rail 3 and the upper rail 4.

As illustrated in FIG. 4, a lock member 30 formed by a plate member is rotatably connected within the upper rail 4 by a support pin 22 serving as a shaft portion, an axis line of which extends in the width direction. That is, the lock member 30 extends in the front and rear direction and includes a pair of vertical wall portions 32 arranged next to each other in the width direction. The vertical wall portions 32 extend over an entire length in a longitudinal direction of the lock member 30 so as to stand in an upper and lower direction thereof. As illustrated in FIGS. 3A and 36, a distance between the vertical wall portions 32 in the width direction is designed to be smaller than a distance between the second side wall portions 14 of the upper rail 4 in the width direction. In addition, as illustrated in FIG. 2, upper edges at front end portions of the vertical wall portions 32 are connected to each other by a holding wall 33 in the width direction. The vertical wall portions 32 include rear portions located at a rear side of the holding wall 33 and upper edges at the rear portions of the vertical wall portions 32 are connected to each other by a ceiling plate portion 34 in the width direction. Shaft attachment holes 35 each including an annular shape and being coaxial with the support pin 22 (the bearing holes 17) are formed at respective intermediate portions of the vertical wall portions 32 in the longitudinal direction. The support pin 22, both end portions of which are supported by the bearing holes 17, is inserted in the shaft attachment holes 35; thereby, the lock member 30 is rotatably supported by the upper rail 4.

The lock member 30 further includes a pair of support walls 36 each arranged between the holding wall 33 and the shaft attachment hole 35 in the longitudinal direction. The support walls 36 protrude inwardly from lower edges of the vertical wall portions 32 in the width direction and face each other in the width direction. Each of the support walls 36 includes a flange shape. Furthermore, the lock member 30 includes a pair of lock portions 37 arranged at rear end portions of the vertical wall portions 32. The lock portions 37 are provided so as to protrude outwardly from the lower edges of the rear end portions of the vertical wall portions 32 in the width direction and so as to separate from each other in the width direction. Each of the lock portions 37 is inserted in the lock-portion insertion opening portion 19a of the second side wall portion 14. Three lock holes 39 each including a substantially quadrangular shape are formed at predetermined intervals at the lock portion 37 and are arranged next to one another in a front and rear direction of the lock member 30. As illustrated in FIG. 4, the lock holes 39 are opened in the upper and lower direction of the lock member 30 so as to face the flange 13a of the first folded wall portion 13 of the lower rail 3. The lock holes 39 are provided at positions conforming to the plural (three) locked portions 13c next to each other in the longitudinal direction of the lower rail 3.

As illustrated in FIG. 4, in a case where the lock member 30 rotates about the bearing holes 17 so that the lock portions 37 move upward, the locked portions 13c are insertable in the corresponding lock holes 39. When the locked portions 13c are inserted in the lock holes 39, the relative movement between the lower rail 3 and the upper rail 4 is in the locked state. On the other hand, in a case where the lock member 30 rotes about the bearing holes 17 so that the lock portions 37 move downward, the locked portions 13c inserted in the corresponding lock holes 39 disengage therefrom. At this time, the locked state of the relative movement between the lower rail 3 and the upper rail 4 is released. In other words, the lock-portion insertion opening portion 19a includes a sufficient opening width in the upper and lower direction to allow each of the lock portions 37 to engage with and disengage from the locked portions 13c.

In addition, the holding wall 33 of the lock member 30 includes a circular arc shape having a convex portion projected downward in side view. A spring insertion hole 34a including a substantially quadrangular shape is formed at a front end portion of the ceiling plate portion 34 of the lock member 30. An attachment hole 34b including a substantially quadrangular shape is formed at the ceiling plate portion 34 so as to conform to a position of the flange-portion movement restriction opening 23 in the front and rear direction.

Figure 6B:
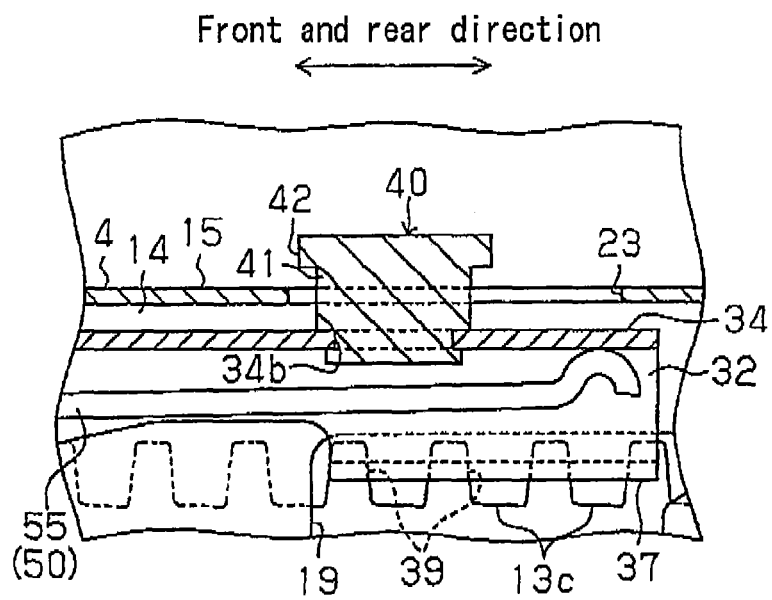
FIG. 6B is an enlarged vertical cross-sectional view of the flange-portion movement restriction opening and the lock member according to the embodiment.

Here, a flanged member 40 formed in a substantially square pole is fixed to the ceiling plate portion 34 of the lock member 30 in a manner to be inserted in the attachment hole 34b. As illustrated in FIG. 6B, the flanged member 40 includes a body portion 41 formed in a substantially square pole and protruding above the ceiling plate portion 34, and a flange portion 42 protruding outwardly from an upper peripheral portion of the body portion 41 therealong. In a normal state, the flanged member 40 is insertable in and removable from the insertion hole 23a (the flange-portion movement restriction opening 23) in accordance with the rotation of the lock member 30 around the bearing holes 17, i.e., in accordance with engagement and disengagement of the lock portions 37 relative to the locked portions 13c. In particular, as illustrated in FIG. 6A, a length L1 of the flange portion 42 in a front and rear direction of the flanged member 40 is designed to be smaller than an opening width W1 of the insertion hole 23a in a front and rear direction of the flange-portion movement restriction opening 23. A length L2 of the flange portion 42 in a width direction of the flanged member 40 is designed to be smaller than an opening width W2 of the insertion hole 23a in a width direction of the flange-portion movement restriction opening 23. In addition, in a state where the lock portions 37 are engaged with the locked portions 13c, the flanged member 40 is configured so that the body portion 41 faces an inner wall surface of the flange-portion movement restriction opening 23, i.e., so that the flange portion 42 is arranged so as to protrude above the second connecting wall portion 15. An opening width W3 of the restriction hole 23b in the width direction of the flange-portion movement restriction opening 23 is designed to be greater than a length L3 of the body portion 41 in the width direction of the flanged member 40. In addition, the opening width W3 is designed to be smaller than the length L2 of the flange portion 42 in the width direction of the flanged member 40.

As illustrated in FIG. 4, a wire spring 50 serving as a biasing member formed by a single wire rod is arranged within the upper rail 4. As illustrated in FIG. 2, the wire spring 50 is formed in a substantially U-shape opened to a rear side thereof (the rear side of the upper rail 4) when seen in planar view. The wire spring 50 includes a pair of extending portions 51 being symmetric bilaterally and extending in a front and rear direction of the wire spring 50, and a connecting portion 52 formed in a circular arc shape and connecting front ends of the extending portions 51 in a width direction of the wire spring 50. In addition, each of the extending portions 51 includes a fixed portion 53. An intermediate portion of the extending portion 51 in a longitudinal direction thereof is curved upward to thereby form the fixed portion 53. The extending portion 51 further includes a coil portion 54 provided at a rear side of the fixed portion 53 and wound toward the rear side in a clockwise direction seen in FIG. 2. Further, the wire spring 50 includes a first biasing portion 55 formed by a portion which is arranged at the rear side of the fixed portions 53 of the extending portions 51 including the coil portions 54, respectively. Furthermore, the wire spring 50 includes a second biasing portion 56 formed by the connecting portion 52 and by a portion which is arranged at a front side of the fixed portions 53 of the extending portions 51.

As illustrated in FIG. 4, the wire spring 50 is arranged within the lock member 30 in a manner that the fixed portions 53 protrude from the spring insertion hole 34a of the lock member 30 and the support hole 21 of the upper rail 4. The coil portions 54 are wound around the support pin 22; thereby, the wire spring 50 is supported by the upper rail 4 (the pair of second side wall portions 14). Further, the fixed portions 53 are in contact with a rear end surface of the support hole 21. Furthermore, a rear end portion of the first biasing portion 55 is elastically in contact with a lower surface of the ceiling plate portion 34, i.e., the wire spring 50 is configured so that a portion at a rear side of the coil portions 54 (the support pin 22) is elastically in contact with the lower surface of the ceiling plate portion 34. In other words, the first biasing portion 55 including the coil portions 54 is elastically deformed around a fixed position (the fixed portions 53) at which the first biasing portion 55 is fixed to the upper rail 4; thereby, the lock member 30 is biased around the fixed position by the first biasing portion 55. Therefore, the lock member 30 is rotatably biased by the wire spring 50 (the first biasing portion 55) in a direction in which the lock portions 37 move upward, i.e., in a direction in which the locked portions 13c are insertable in the corresponding lock holes 39.

In addition, the fixed portions 53 of the wire spring 50 are in a non-contact manner with a front end surface of the support hole 21 and the connecting portion 52 of the wire spring 50 (the second biasing portion 56) is positioned adjacent to the holding wall 33.

As illustrated in FIG. 2, a tubular member is bent by bending forming, thereby forming the release handle 6. The release handle 6 is formed so as to extend between the pair of upper rails 4 in the width direction while being arranged at a front side of the upper rails 4. The release handle 6 includes end portions 61 extending in a rearward direction of the release handle 6. The end portions 61 are inserted in the corresponding lock members 30 in the width direction as will be described below. Each of the end portions 61 is formed in a circular cylinder having an outer diameter that is smaller than the distance between the vertical wall portions 32 in the width direction. A support groove 62 extending in the width direction and forming a slit is formed at a lower portion of the end portion 61.

As illustrated in FIG. 4, the end portion 61 is inserted between the vertical wall portions 32 of each of the corresponding lock members 30 in the width direction so as to be positioned at a lower side of the holding wall 33 and at an upper side of the support walls 36. The connecting portion 52 of the wire spring 50 (the second biasing portion 56) is inserted and fit in the support groove 62; thereby, the end portion 61 is locked by the wire spring 50 and is therefore restricted from being detached from the wire spring 50. That is, a rear end surface 62a of the support groove 62 serves as an engagement surface for restricting the end portion 61 of the release handle 6 from being detached from the wire spring 50.

The end portion 61 inserted between the vertical wall portions 32 is biased via the support groove 62 by the wire spring 50 (the second biasing portion 56) so as to move upward. Therefore, the end portion 61 is supported by the wire spring 50 so as to integrally rotate with the lock member 30 substantially about the bearing holes 17 in a manner that an upper portion of the end portion 61 is in contact with a lower surface of the holding wall 33 and a lower portion of the end portion 61 is in contact with upper surfaces of the support walls 36. In other words, the wire spring 50 functions to elastically hold the release handle 6 so that the release handle 6 integrally rotates with the lock member 30. The wire spring 50 elastically holds the release handle 6 by the connecting portion 52. For example, in a case where the end portion 61 (the release handle 6) may rotate about the bearing holes 17 in an opposite direction from a desired operation direction because of an unexpected external force, the wire spring 50 elastically holds the release handle 6 by the connecting portion 52 so that the end portion 61 is rotatable relative to the lock member 30 to thereby avoid an excessive load from acting on the lock members 30.

Next, an operation of the seat slide apparatus of the embodiment will be described as follows. Firstly, for example, the release handle 6 is in a state where an operating force thereof is not transmittal to the lock member 30. At this time, the lock member 30 rotates by a biasing force of the wire spring 50 (the first biasing portion 55) along with the end portions 61 (the release handle 6) around the support pin 22 in the direction in which the lock portions 37 move upward, i.e., in the direction in which the locked portions 13c are insertable in the corresponding lock holes 39. As a result, the relative movement between the lower rail 3 and the upper rail 4 is brought in the locked state in the aforementioned manner; therefore, a position of the seat 5 supported by the pair of upper rails 4 in the front and rear direction is held.

Thereafter, for example, the release handle 6 is operated so that a front end thereof moves upward. At this time, the lock member 30 rotates against the biasing force of the wire spring 50 (the first biasing portion 55) along with the end portion 61 (the release handle 6) around the support pin 22 in a direction in which the lock portions 37 move downward, i.e., in a direction in which the locked portions 13c disengage from the corresponding lock holes 39. As a result, the locked state of the relative movement between the lower rail 3 and the upper rail 4 is released in the aforementioned manner; therefore, the position of the seat 5 supported by the pair of upper rails 4 in the front and rear direction is adjustable.

For example, a large load is applied to a front portion of the vehicle because of a front collision of the vehicle in a condition where the relative movement between the lower rail 3 and the upper rail 4 is brought in the locked state by the lock member 30. In such case, the upper rail 4 moves forward relative to the lower rail 3. As described above, according to the embodiment, the fracture opening 18 is formed at each of the second side wall portions 14 of the upper rail 4 so as to be positioned next to and at the rear side of the bearing hole 17. Therefore, the support pin 22 shifts to the rear side of the bearing holes 17 of the second side wall portions 14 while the stress concentration portions Sc are elastically deformed by the support pin 22. Thus, the support pin 22 is allowed to shift from the bearing holes 17 by the fracture openings 18; thereby, the lock member 30 moves rearward relative to the upper rail 4 along with the lower rail 3.

At this time, each of the lock portions 37 of the lock member 30 shifts from the lock-portion insertion opening portion 19a to the lock-portion restriction opening portion 19b in a manner to be guided by the inclined portion 19c of the lock-portion restriction opening portion 19b. As a result, the lock member 30 is restricted from rotating in a direction in which the engagement between the lock portions 37 and the locked portions 13c (the locked state of the relative movement between the lower rail 3 and the upper rail 4) is released. In other words, the lock-portion restriction opening portion 19b includes an opening width in the upper and lower direction, which does not allow the engagement between the lock portion 37 and the locked portions 13c to be released. In addition, a rearward movement of the lock member 30 relative to the upper rail 4 is locked basically by a contact of the lock portion 37 to a rear end of the lock-portion restriction opening portion 19b. That is, a movable distance of the lock portion 37 is the opening width A1 of the lock-portion restriction opening portion 19b.

Additionally, the body portion 41 of the flanged member 40 shifts from the insertion hole 23a to the restriction hole 23b of the flange-portion movement restriction opening 23 in accordance with the rearward movement of the lock member 30 relative to the upper rail 4; thereby, a lower surface of the flange portion 42 of the flanged member 40 is contactable with a peripheral portion of the restriction hole 23b, that is, the lock member 30 is not rotatable around the bearing holes 17 in the direction in which the lock portions 37 of the lock member 30 move downward. Therefore, the lock member 30 is restricted from rotating in the direction in which the engagement between the lock portions 37 and the locked portions 13c (the locked state of the relative movement between the lower rail 3 and the upper rail 4) is released.

Here, according to the embodiment, the opening width A2 of the fracture opening 18 in the front and rear direction is designed to be substantially equal to or greater than the opening width A1 of the lock-portion restriction opening portion 19b in the front and rear direction. For example, a large load is applied to the front portion of the vehicle because of a front collision of the vehicle in a state where the lock portions 37 of the lock member 30 are engaged with the locked portions 13c of the lower rail 3. In such case, a movable distance in which the support pin 22 moves from the bearing hole 17 to the fracture opening 18 substantially corresponds to a distance in which a front end surface of the fracture opening 18 makes contact with a rear end surface of the fracture opening 18, i.e., the movable distance of the support pin 22 is substantially equal to the opening width A2 of the fracture opening 18. Meanwhile, a movable distance in which each of the lock portions 37 of the lock member 30 moves within the lock-portion restriction opening portion 19b is substantially equal to the opening width A1 of the lock-portion restriction opening portion 19b. Therefore, the lack portion 37 may move within the lock-portion restriction opening portion 19b to each of ends thereof in the front and rear direction while not being restricted by the movable distance of the support pin 22.

As describe above, following effects may be obtained by the seat slide apparatus according to the aforementioned embodiment. According to the embodiment, for example, a large load is inputted in a direction of the relative movement between the lower rail 3 and the upper rail 4 because of a front collision of the vehicle in a condition where the relative movement between the lower rail 3 and the upper rail 4 is brought in the locked state by the lock member 30. In such case, the fracture openings 18 allow the support pin 22 to shift from the bearing holes 17; thereby, the lock member 30 moves rearward relative to the upper rail 4 along with the lower rail 3 (the lock member 30 moves relative to the upper rail 4 along with the lower rail 3 in the direction of the relative movement). At this time, the lock member 30 is restricted by the lock-portion restriction opening portion 19b from rotating in the direction in which the locked state of the relative movement between the lower rail 3 and the upper rail 4 is released; thereby, the locked state of the relative movement may be further stably maintained. In particular, according to the embodiment, the fracture openings 18 are provided to separate from the bearing holes 17; therefore, a clearance allowance between the support pin 22 and each of the bearing holes 17 may not increase and thus the lock member 30 is restricted from unstably rotating in accordance with the engagement and disengagement between the lock portions 37 and the locked portions 13c. In addition, the lock member 30 includes an end located adjacent to the release handle 6 (the end portion 61) and an extending portion (for example, the holding wall 33) extending to the end located adjacent to the release handle 6 (the end portion 61). The lock member 30 may be connected to the release handle 6 by the extending portion (for example, the holding wall 33); therefore, the length and mass of the release handle 6 are restricted from being increased.

According to the embodiment, for example, in a case where a large load is inputted in the direction of the relative movement by a front collision of the vehicle to therefore shift the support pin 22 from the bearing holes 17, the flange portion 42 of the flanged member 40 engages with the flange-portion movement restriction opening 23 (the restriction hole 23b). Therefore, the lock member 30 may be restricted by both the flange-portion movement restriction opening 23 and the lock-portion restriction opening portion 19b from rotating in the direction in which the locked state of the relative movement is released. As a result, the locked state of the relative movement may be further surely maintained.

According to the embodiment, for example, a large load is inputted in the direction of the relative movement between the lower rail 3 and the upper rail 4 because of a front collision of the vehicle in a condition where the lock portions 37 of the lock member 30 are engaged with the locked portions 13c of the lower rail 3. In such case, the boundary portion (the stress concentration portion Sc) between the support pin 22 and the bearing hole 17 is deformed by a load applied between the support pin 22 and the bearing hole 17, therefore shifting the support pin 22 from the bearing hole 17 to the fracture opening 18. Along with such shifting of the support pin 22, the lock portion 37 of the lock member 30 shifts to the lock-portion restriction opening portion 19b and engages therewith; therefore, the lock member 30 is restricted from rotating in the direction in which the locked state of the relative movement is released. Thus, the disengagement between the lock portions 37 and the locked portions 13c because of the rotation of the lock member 30 is restricted and the large load inputted in the direction of the relative movement is concentrated to be applied between the lock portions 37 and the locked portions 13c. In such condition where the large load is concentrated to be applied between the lock portions 37 and the locked portions 13c, a shearing load is mainly applied to the lock portions 37 and the locked portions 13c; therefore, the engagement between the lock portions 37 and the locked portions 13c may be increased.

In addition, for example, even in a case where one of the locked portions 13c is damaged by the shearing load, one of the lock holes 39 of the lock portion 37 may engage with the locked portion 13c positioned next to the locked portion 13c damaged by the shearing load. As a result, an energy caused by the shearing load is absorbed by the damage of the locked portion 13c; therefore, the upper rail 4 may be restricted from excessively moving relative to the lower rail 3.

According to the embodiment, for example, a large load is inputted in the direction of the relative movement between the lower rail 3 and the upper rail 4 because of a front collision of the vehicle in a condition where the lock portions 37 of the lock member 30 are engaged with the locked portions 13c of the lower rail 3. In such case, the opening width A2 of the fracture opening 18, corresponding to the movable distance in which the support pin 22 moves from the bearing hole 17 to the fracture opening 18 is designed to be equal to or greater than the opening width A1 of the lock-portion restriction opening portion 19b, corresponding to the movable distance in which each of the lock portions 37 of the lock member 30 moves within the lock-portion restriction opening portion 19b. Therefore, the lock portion 37 may move within the lock-portion restriction opening portion 19b to each of the ends thereof in the front and rear direction while not being restricted by the movable distance of the support pin 22. As a result, an engagement allowance between the lock portion 37 and the lock-portion restriction opening portion 19b, which is involved with the restriction of the rotation of the lock member 30 in the direction in which the locked state of the relative movement between the lower rail 3 and the upper rail 4 is released, may be secured to maximum. In addition, the engagement between the lock portions 37 and the locked portions 13c may be further increased.

According to the embodiment, in the case of a front collision of the vehicle, i.e., in a condition where a large load may be applied from the front portion of the vehicle relative to the seat 5, the fracture openings 18 may allow the support pin 22 to shift from the bearing holes 17 to a rear side of the vehicle. In addition, the relative movement between the lower rail 3 and the upper rail 4 may be further stably maintained.

According to the embodiment, the release handle 6 (the end portion 61) is substantially connected to the lock member 30 so as to integrally rotate therewith; thereby, such connecting configuration between the lock member 30 and the release handle 6 may be further simplified compared, for example, to a configuration in which the release handle 6 and the lock member 30 rotate around different axes from each other, i.e., a configuration associated with an axial transformation between the release handle 6 and the lock member 30. In addition, manufacturing costs may be reduced.

Figure 7:
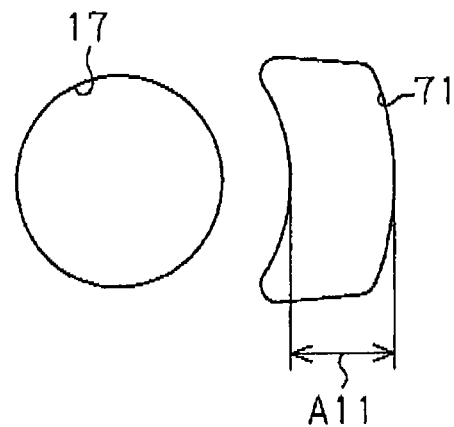
FIG. 7 is a side view of the fracture opening according to a modified example of the embodiment.
Figure 8:
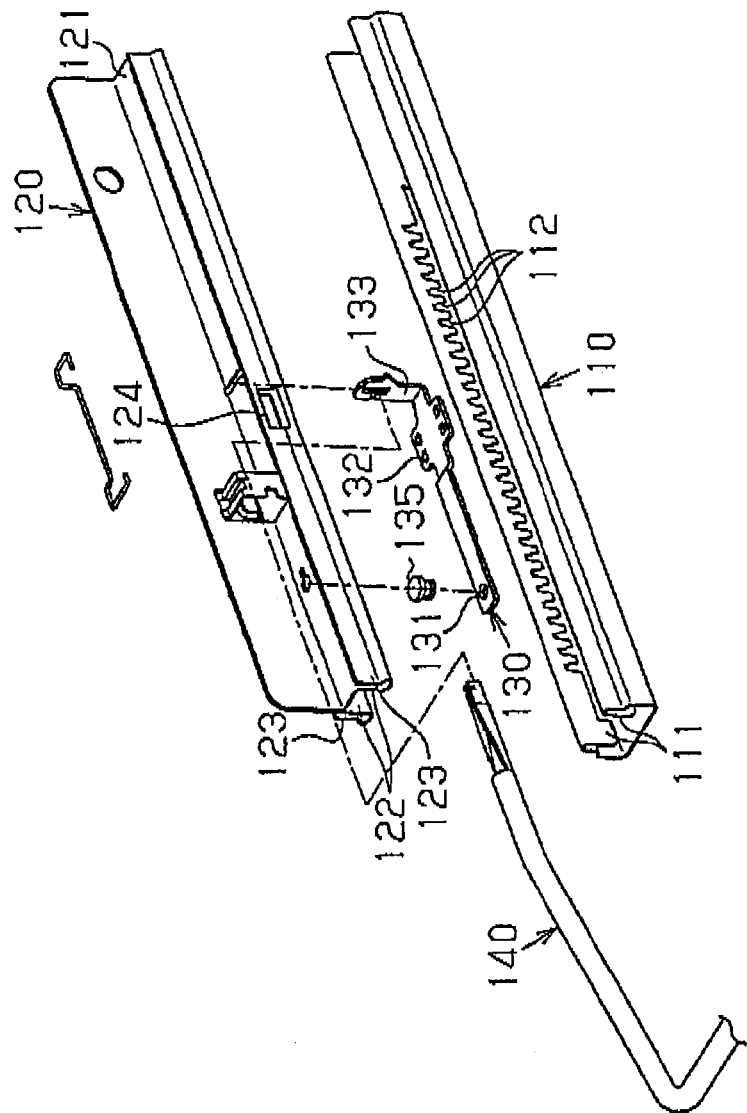
FIG. 8 is a perspective view of a known seat slide apparatus for a vehicle.
Figure 9A:
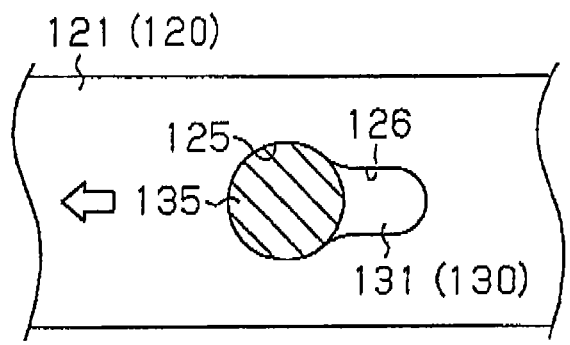
FIG. 9A is an enlarged plan view of a fixing hole and a movement allowing portion that are formed in an upper rail according to the known seat slide apparatus.
Figure 9B:
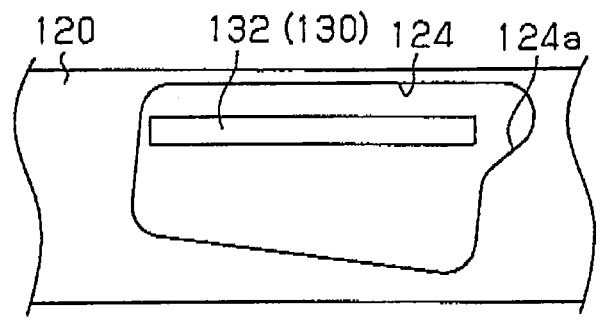
FIG. 9B is an enlarged side view of a lock-portion insertion opening formed in the upper rail according to the known seat slide apparatus.

The seat slide apparatus according to the embodiment may be modified as follows. According to the embodiment, the fracture opening 18 is provided at the rear side of the bearing hole 17. Alternatively, as illustrated in FIG. 7 illustrating a modified example of the embodiment, a fracture opening 71 including a substantially circular arc shape may be provided at the rear side of the bearing hole 17. In the modified example, it is appropriate that an opening width A11 of the fracture opening 71 in the direction of the relative movement is designed to be equal to or greater than the opening width A1 of the lock-portion restriction opening portion 19b.

According to the embodiment and the modified example of the embodiment, the fracture opening 18, 71 is arranged at the rear side of the bearing hole 17 and the lock-portion restriction opening portion 19b is continuously formed with the rear end of the lock-portion insertion opening portion 19a so as to connect thereto. Alternatively, the fracture opening 18, 71 may be arranged at the front side of the bearing hole 17 and a lock-portion restriction opening portion similar to that of the embodiment may be continuously formed with a front end of the lock-portion insertion opening portion 19a so as to connect thereto. Or alternatively, in addition to the fracture opening 18, 71 arranged at the rear side of the bearing hole 17 and the lock-portion restriction opening portion 19b continuously formed with the rear end of the lock-portion insertion opening portion 19a, the fracture opening 18, 71 may be arranged at the front side of the bearing hole 17 and the lock-portion restriction opening portion similar to that of the embodiment may be continuously formed with the front end of the lock-portion insertion opening portion 19a so as to connect thereto. According to the aforementioned configuration, for example, in a case where a large load is inputted from the rear side of the vehicle relative to the seat 5, the aforementioned fracture openings 18, 71 arranged at the front side of the bearing holes 17 in the width direction allow the support pin 22 to shift to the front side of the vehicle. In addition, the aforementioned lock-portion restriction opening portions formed with the respective front ends of the lock-portion insertion opening portions 19a in the width direction restrict the lock member 30 from rotating in the direction in which the locked state of the relative movement between the lower rail 3 and the upper rail 4 is released. Therefore, the locked state of the relative movement between the lower rail 3 and the upper rail 4 may be further stably maintained.

In the embodiment, the opening width A2 of the fracture opening 18 may be smaller than the opening width A1 of the lock-portion restriction opening portion 19b. In the modified example of the embodiment, the opening width A11 of the fracture opening 71 may be smaller than the opening width A1 of the lock-portion restriction opening portion 19b. In the embodiment, the flanged member 40 and the flange-portion movement restriction opening 23 may be omitted.

According to the embodiment, the support pin 22 that is a separate component from the lock member 30 is supported by the bearing holes 17 of the upper rail 4. Alternatively, a shaft portion may be integrally formed with each of the vertical wall portions 32 of the lock member 30, for example, by half blanking so as to have a portion protruding and recessed outwardly from the vertical wall portion 32 and thus the shaft portion is inserted in and supported by the bearing hole 17. In such case, the number of components may be reduced.

In the embodiment, for example, protruding portions are be cut at the second side wall portions 14 and raised therefrom so as to extend inward in the width direction in which the second side wall portions 14 face each other and so as to disturb a trajectory of the rotation of the lock member 30. The protruding portions may be applied to the seat slide apparatus so as to serve as the restriction portions 19b for restricting the lock member 30 from rotating in the direction in which the locked state of the relative movement between the lower rail 3 and the upper rail 4 is released.

In the embodiment, a biasing member for biasing the lock member 30 and a holding member for holding the release handle 6 (for holding the end portion 61) may be provided as separate members from each other. In the embodiment, multiple plate members may be connected to one another, for example, by welding to configure the lower rail 3. In addition, the lower rail 3 according to the embodiment is formed in the U-shaped cross section. Alternatively, the lower rail 3 may be formed in a different cross section from the U-shaped cross section as long as the lower rail 3 includes a pair of flanges 13a.

In the embodiment, the upper rail 4 may be formed, for example, by a single plate member. In addition, the upper rail 4 according to the embodiment is formed in the U-shaped cross section. Alternatively, the upper rail 4 may be formed in a different cross section from the U-shaped cross section as long as the upper rail 4 includes the pair of side wall portions (second side wall portions) 14.

According to the embodiment, the lock member 30 includes the pair of lock portions 37 arranged at the respective vertical wall portions 32. Alternatively, each of the lock portions 37 may be a separate portion from each of the vertical wall portions 32. Additionally, a fixing relation between the lower rail 3 and the upper rail 4 (i.e., a positional relation between the lower rail 3 and the upper rail 4 in the upper and lower direction) in the embodiment may be reversed. In a case where the positional relation between the lower rail 3 and the upper rail 4 in the upper and lower direction in the embodiment is reversed, the lock member 30 arranged in the vicinity of the vehicle floor 2 may be operated, for example, via a cable, by an appropriate operation member in order to disengage the lock member 30 from the locked portions 13c of the lower rail 3.

In the embodiment, the single lower rail 3 and the single upper rail 4 (that configure the single seat slide apparatus) may be provided to the seat 5 or the three or more lower rails 3 and the three or more upper rails 4 may be provided to the seat 5.

In the embodiment, the direction of the relative movement between the lower rail 3 and the upper rail 4 may correspond to, for example, the front and rear direction of the vehicle.

As described above, according to the aforementioned embodiment, the seat slide apparatus for the vehicle includes the lower rail 3 including the pair of flanges 13a arranged next to each other in the width direction of the vehicle and including the ends, at each of which the locked portions 13c are formed, the upper rail 4 movably connected relative to the lower rail 3 and including the pair of second side wall portions 14 arranged next to each other between the flanges 13a in the width direction, the upper rail 4 including the bearing holes 17, each axis line of which extends in the width direction, the lock member 30 including the pair of vertical wall portions 32 which are arranged next to each other between the second side wall portions 14 in the width direction and at which the support pin 22 supported in the bearing holes 17 is arranged, and the lock portions 37 engageable with and disengageable from the locked portions 13c, the lock member 30 rotating around the bearing holes 17 to engage the lock portions 37 with the locked portion 13c and disengage the lock portions 37 from the locked portion 13c to selectively bring the relative movement between the lower rail 3 and the upper rail 4 into the locked state, the wire spring 50 biasing the lock member 30 to rotate in the direction in which the relative movement between the lower rail 3 and the upper rail 4 is brought in the locked state, and the release handle 6 configured to transmit the operating force for releasing the locked state of the relative movement to the lock member 30. The fracture opening 18, 71 is formed at each of the second side wall portions 14 and is positioned next to each of the bearing holes 17 in a separating manner from the bearing hole 17 in the direction of the relative movement between the lower rail 3 and the upper rail 4. The fracture opening 18, 71 allows the support pin 22 to shift from the bearing hole 17 in a case where a load is inputted in the direction of the relative movement. The restriction portion 19b formed at the upper rail 4 is configured to restrict the lock member 30 from rotating in the direction in which the locked state of the relative movement is released in a case where the support pin 22 shifts from the bearing hole 17.

According to the aforementioned configuration, for example, a large load is inputted in the direction of the relative movement between the lower rail 3 and the upper rail 4 because of a collision of the vehicle in a condition where the relative movement is brought in the locked state by the lock member 30. In such case, the fracture opening 18, 71 allows the support pin 22 to shift from the bearing hole 17; thereby, the lock member 30 moves relative to the upper rail 4 along with the lower rail 3 in the direction of the relative movement. At this time, the lock member 30 is restricted by the restriction portion 19b from rotating in the direction in which the locked state of the relative movement is released; thereby, the locked state of the relative movement may be further stably maintained. In particular, the fracture opening 18 is provided to separate from the bearing hole 17; therefore, the clearance allowance between the support pin 22 and the bearing hole 17 may not increase and thus the lock member 30 is restricted from unstably rotating in accordance with the engagement and disengagement between the lock portions 37 and the locked portions 13c. In addition, the lock member 30 is rotatably connected to the upper rail 4 by the support pin 22 supported in the bearing holes 17. Accordingly, the lock member 30 may be configured to have the extending portion (for example, the holding wall 33) extending toward the release handle 6, thereby being connected to the release handle 6 by the extending portion. Consequently, the length and mass of the release handle 6 may be restricted from being increased.

According to the aforementioned embodiment, the seat slide apparatus further includes the flanged member 40 attached to the lock member 30 and including the flange portion 42. The upper rail 4 includes the second connecting wall portion 15 connecting the upper ends of the second side wall portions 14 in the width direction, the upper ends being located away from the lower rail 3. The flange-portion movement restriction opening 23 is formed at the second connecting wall portion 15. The flange portion 42 is insertable in and removable from the flange-portion movement restriction opening 23 in accordance with the engagement and disengagement of the lock portions 37 relative to the locked portions 13c. In a case where the support pin 22 shifts from the bearing hole 17, the flange portion 42 engages with the flange-portion movement restriction opening 23 to restrict the lock member 30 from rotating in the direction in which the locked state of the relative movement is released.

According to the aforementioned configuration, for example, in a case where a large load is inputted in the direction of the relative movement by a collision of the vehicle to therefore shift the support pin 22 from the bearing hole 17, the flange portion 42 of the flanged member 40 engages with the flange-portion movement restriction opening 23. Therefore, the lock member 30 may be restricted by both the flange-portion movement restriction opening 23 and the restriction portion 19b from rotating in the direction in which the locked state of the relative movement is released. As a result, the locked state of the relative movement may be further surely maintained.

According to the aforementioned embodiment, the lock-portion insertion opening portion 19a which is opened in the width direction and in which the lock portion 37 is inserted is formed at each of the second side wall portions 14. The restriction portion 19b is continuously formed with the lock-portion insertion opening portion 19a to connect thereto. The restriction portion 19b corresponds to the lock-portion restriction opening portion 19b engaging with the lock portion 37 in a case where the support pin 22 shifts from the bearing hole 17 to restrict the lock member 30 from rotating in the direction in which the locked state of the relative movement is released.

According to the aforementioned configuration, for example, a large load is inputted in the direction of the relative movement because of a collision of the vehicle in a condition where the lock portions 37 of the lock member 30 are engaged with the locked portions 13c of the lower rail 3. In such case, the boundary portion between the support pin 22 and the bearing hole 17 is deformed by a load applied between the support pin 22 and the bearing hole 17, therefore shifting the support pin 22 from the bearing hole 17 to the fracture opening 18. Along with such shifting of the support pin 22, the lock portion 37 of the lock member 30 shifts to the lock-portion restriction opening portion 19b and engages therewith; therefore, the lock member 30 is restricted from rotating in the direction in which the locked state of the relative movement is released. Thus, the disengagement between the lock portions 37 and the locked portions 13c resulting from the rotation of the lock member 30 is restricted and the large load inputted in the direction of the relative movement is concentrated to be applied between the lock portions 37 and the locked portions 13c. In such condition where the large load is concentrated to be applied between the lock portions 37 and the locked portions 13c, a shearing load is mainly applied to the lock portions 37 and the locked portions 13c; therefore, the engagement between the lock portions 37 and the locked portions 130 may be increased.

According to the aforementioned embodiment, the opening width A2, A11 of the fracture opening 18, 71 in the direction of the relative movement is designed to be equal to or greater than the opening width A1 of the lock-portion restriction opening portion 19b in the direction of the relative movement.

According to the aforementioned configuration, for example, a large load is inputted in the direction of the relative movement because of a collision of the vehicle in a condition where the lock portions 37 of the lock member 30 are engaged with the locked portions 13c of the lower rail 3. In such case, the movable distance in which the support pin 22 moves from the bearing hole 17 to the fracture opening 18 substantially corresponds to the opening width A2 of the fracture opening 18. Meanwhile, the movable distance in which each of the lock portions 37 of the lock member 30 moves within the lock-portion restriction opening portion 19b substantially corresponds to the opening width A1 of the lock-portion restriction opening portion 19b. Therefore, the lock portion 37 may move within the lock-portion restriction opening portion 19b to each of the ends thereof while not being restricted by the movable distance of the support pin 22. As a result, the engagement allowance between the lock portion 37 and the lock-portion restriction opening portion 19b, which is involved with the restriction of the rotation of the lock member 30 in the direction in which the locked state of the relative movement is released, may be secured to maximum. In addition, the engagement between the lock portions 37 and the locked portions 13c may be further increased.

According to the aforementioned embodiment, the direction of the relative movement corresponds to the front and rear direction of the vehicle. The fracture opening 18 includes the pair of inclined opening portions 18a, 18b symmetric in the upper and lower direction relative to the line linearly passing through the center of the bearing hole 17 and extending in the front and rear direction, and the extending opening portion 18c extending from the connected portion of the inclined opening portions 18a, 18l) to the rear side of the vehicle along the line.

According to the aforementioned embodiment, the direction of the relative movement corresponds to the front and rear direction of the vehicle. The fracture opening 71 is formed in the circular arc shape curved to the rear side of the vehicle.

According to the aforementioned embodiment, the direction of the relative movement corresponds to the front and rear direction of the vehicle. The fracture opening 18, 71 is arranged at the rear side of the bearing hole 17.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention clamed is:

1. A seat slide apparatus for a vehicle, comprising:
a first rail including a pair of flanges arranged next to each other in a width direction of the vehicle and including ends, at each of which a locked portion is formed;
a second rail movably connected relative to the first rail and including a pair of side wall portions arranged next to each other between the flanges in the width direction, the second rail including bearing holes, each axis line of which extends in the width direction;
a lock member including a pair of vertical wall portions which are arranged next to each other between the side wall portions in the width direction and at which a shaft portion supported in the bearing holes is arranged, and a lock portion engageable with and disengageable from the locked portion, the lock member rotating around the bearing holes to engage the lock portion with the locked portion and disengage the lock portion from the locked portion to selectively bring a relative movement between the first rail and the second rail into a locked state;
a biasing member biasing the lock member to rotate in a direction in which the relative movement between the first rail and the second rail is brought in the locked state; and
an operation member configured to transmit an operating force for releasing the locked state of the relative movement to the lock member,
wherein a fracture opening is formed at each of the side wall portions and is positioned next to each of the bearing holes in a separating manner from the bearing hole in a direction of the relative movement between the first rail and the second rail, the fracture opening allowing the shaft portion to shift from the bearing hole in a case where a load is inputted in the direction of the relative movement, and
wherein a restriction portion is formed at the second rail and is configured to restrict the lock member from rotating in a direction in which the locked state of the relative movement is released in a case where the shaft portion shifts from the bearing hole.

2. The seat slide apparatus according to claim 1, further comprising:
a flanged member attached to the lock member and including a flange portion,
wherein the second rail includes a connecting wall portion connecting ends of the side wall portions in the width direction, the ends being located away from the first rail, and a flange-portion movement restriction opening is formed at the connecting wall portion, the flange-portion movement restriction opening being separate from the restriction portion,
wherein the flange portion is insertable in and removable from the flange-portion movement restriction opening in accordance with engagement and disengagement of the lock portion relative to the locked portion, and
wherein in a case where the shaft portion shifts from the bearing hole, the flange portion engages with the flange-portion movement restriction opening to restrict the lock member from rotating in the direction in which the locked state of the relative movement is released.

3. The seat slide apparatus according to claim 1, wherein a lock-portion insertion opening portion which is opened in the width direction and in which the lock portion is inserted is formed at each of the side wall portions, and
wherein the restriction portion is continuously formed with the lock-portion insertion opening portion to connect thereto, the restriction portion corresponding to a lock-portion restriction opening portion engaging with the lock portion in a case where the shaft portion shifts from the bearing hole to restrict the lock member from rotating in the direction in which the locked state of the relative movement is released.

4. The seat slide apparatus according to claim 2, wherein a lock-portion insertion opening portion which is opened in the width direction and in which the lock portion is inserted is formed at each of the side wall portions, and
wherein the restriction portion is continuously formed with the lock-portion insertion opening portion to connect thereto, the restriction portion corresponding to a lock-portion restriction opening portion engaging with the lock portion in a case where the shaft portion shifts from the bearing hole to restrict the lock member from rotating in the direction in which the locked state of the relative movement is released.

5. The seat slide apparatus according to claim 3, wherein an opening width of the fracture opening in the direction of the relative movement is designed to be equal to or greater than an opening width of the lock-portion restriction opening portion in the direction of the relative movement.

6. The seat slide apparatus according to claim 4, wherein an opening width of the fracture opening in the direction of the relative movement is designed to be equal to or greater than an opening width of the lock-portion restriction opening portion in the direction of the relative movement.

7. The seat slide apparatus according to claim 1, wherein the direction of the relative movement corresponds to a front and rear direction of the vehicle, and
wherein the fracture opening includes a pair of inclined opening portions symmetric in an upper and lower direction relative to a line linearly passing through a center of the bearing hole and extending in the front and rear direction, and an extending opening portion extending from a connected portion of the inclined opening portions to a rear side of the vehicle along the line.

8. The seat slide apparatus according to claim 1, wherein the direction of the relative movement corresponds to a front and rear direction of the vehicle, and
wherein the fracture opening is formed in a circular arc shape curved to a rear side of the vehicle.

9. The seat slide apparatus according to claim 1, wherein the direction of the relative movement corresponds to a front and rear direction of the vehicle, and
wherein the fracture opening is arranged at a rear side of the bearing hole.

\* \* \* \* \*